United States Patent
Hildebrand et al.

(10) Patent No.: US 6,817,268 B1
(45) Date of Patent: Nov. 16, 2004

(54) POWER DISTRIBUTION TRANSMISSION

(75) Inventors: Martin Hildebrand, Friedrichshafen (DE); Rudolf Zentsch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/018,412

(22) PCT Filed: Jul. 14, 2000

(86) PCT No.: PCT/EP00/06744
§ 371 (c)(1),
(2), (4) Date: Dec. 13, 2001

(87) PCT Pub. No.: WO01/06150
PCT Pub. Date: Jan. 25, 2001

(30) Foreign Application Priority Data

Jul. 20, 1999 (DE) .......................... 199 33 822

(51) Int. Cl.[7] .............................. F16H 47/06; F16M 7/00
(52) U.S. Cl. ........................ 74/730.1; 74/655; 248/666; 60/338; 60/469
(58) Field of Search ................................ 74/655, 730.1, 74/606 R; 248/638, 664, 666; 60/338, 469

(56) References Cited

U.S. PATENT DOCUMENTS

| | | | |
|---|---|---|---|
| 3,902,567 A | 9/1975 | Pekar, Jr. ................... 180/70 R |
| 4,111,003 A | 9/1978 | Bolinger et al. .............. 60/469 |
| 4,616,478 A | * 10/1986 | Jensen ................... 74/606 R X |
| 4,646,520 A | * 3/1987 | Furumoto et al. ............. 60/469 |
| 4,843,911 A | * 7/1989 | Minegishi et al. .......... 475/180 |
| 4,862,767 A | * 9/1989 | Hauser ......................... 475/83 |
| 5,295,414 A | 3/1994 | Nakamura et al. ............ 74/655 |
| 5,345,839 A | 9/1994 | Nett et al. ................. 74/606 R |
| 5,766,107 A | 6/1998 | Englisch ...................... 475/80 |
| 5,890,982 A | 4/1999 | Meyerle ....................... 475/72 |
| 6,042,496 A | 3/2000 | Lehle et al. .................. 475/81 |

FOREIGN PATENT DOCUMENTS

| | | | |
|---|---|---|---|
| DE | 31 25 119 A1 | 1/1983 | .......... F16H/39/10 |
| DE | 4201156 | * 10/1992 | |
| DE | 44 01 509 A1 | 8/1994 | .......... F16H/47/02 |
| DE | 93 21 259 U1 | 1/1997 | .......... F16H/47/04 |
| DE | 195 22 833 A1 | 1/1997 | .......... F16H/47/04 |
| DE | 44 05 872 C2 | 9/1997 | .......... F16H/39/00 |
| EP | 0 491 903 B1 | 11/1994 | .......... F16H/57/00 |
| EP | 0 702 168 A2 | 3/1996 | .......... F16H/47/00 |
| EP | 834027 | * 4/1998 | |

* cited by examiner

Primary Examiner—Ha Ho
(74) Attorney, Agent, or Firm—Davis & Bujold, P.L.L.C.

(57) ABSTRACT

In order to damp the vibrations in a hydraulic branch of a power distribution transmission, the hydraulic pump (1) and the hydraulic motor (3) which are interconnected are non-rotatably but elastically maintained in the transmission housing in the area of their connecting point by damping elements (5). The input shaft (11) of the hydraulic pump (1) and the output shaft (18) of the hydraulic motor (3) are connected with shafts (12, 17) which on their engagements have crowned teeth or spiral gearings and are floatingly mounted. It is hereby obtained that the hydraulic branch is easy to mount, can freely move and the vibrations it produces are not transmitted to the transmission housing (7) or to the toothed wheels (13, 16) of the mechanical distribution branch.

13 Claims, 4 Drawing Sheets

POWER DISTRIBUTION TRANSMISSION

FIELD OF THE INVENTION

The invention concerns a power distribution transmission.

BACKGROUND OF THE INVENTION

Power distribution transmissions, especially as continuously variable transmissions, are often used to drive motor vehicles, particularly field tractors. Especially adequate here are power distribution transmissions having a mechanical power branch and a hydraulic power branch consisting of a hydraulic pump and a hydraulic motor, preferably with a pump of adjustable displacement. Since during operation of the power distribution transmission, mainly the hydraulic power branch produces strong vibrations which in case of fixed connection of the hydraulic motor and the hydraulic pump with the transmission housing pass on the vibrations to the transmission housing causing loud noise, the hydraulic pump and the hydraulic motor have to be uncoupled from the transmission housing.

DE 44 01 509 A1 discloses a continuously variable transmission with power distribution, especially for motor vehicles, which consists of a hydraulic power branch and a mechanical power branch, there being interconnected in the hydraulic power branch a hydraulic pump and a hydraulic motor and in order to uncouple the hydraulic motor and the hydraulic pump from the housing, they are retained in the transmission housing by damping elements. Damping elements are mounted respectively on each side of the hydraulic motor-pump unit through which the forces in the transmission housing can be transmitted. The suspension is configured so as to create a three-point support which is mounted respectively on the input and output side of the continuously variable converter, consisting of the hydraulic pump and the hydraulic motor, as central bearing for fixing the position of the central axle of the continuously variable converter in relation to the transmission housing and a third bearing as supporting bearing for torque support and optionally axial support of the continuously variable converter and that the central bearing is designed so as to make possible a rotation of the continuously variable converter around its central axle against the torque-supporting bearing. In order to make possible mounting in the transmission housing, the hydraulic motor and the hydraulic transmission with the damping devices, the transmission has to have a divided housing in order to make possible the installation of the hydraulic motor and the hydraulic pump in the transmission housing. If manufacturing tolerances appear, it is possible with this arrangement that the hydraulic motor and the hydraulic pump is installed transversely in the transmission housing whereby, during operation of the power distribution transmission, the damping elements are already compressed to their initial position with the result that the damping of noise is considerably limited. In the transmission, since the input wheels for driving the hydraulic pump and the output wheels on the hydraulic motor are fixedly connected with the shafts of the hydraulic pump and of the hydraulic motor, vibrations and therewith movements are directly transmitted to the running gears in the mechanical power branch whereby the engagement geometry of the running gears is constantly altered.

The problem on which this invention is based is to provide a power distribution transmission having a hydraulic and a mechanical power branch in which the vibrations of the hydraulic power branch are only dampedly emitted to the parts surrounding the hydraulic power branch and the hydraulic power branch stands out by easy installation in the transmission housing.

SUMMARY OF THE INVENTION

According to the invention, the hydraulic power branch consists of a hydraulic pump and a hydraulic motor which are interconnected and in the area of the connection of the hydraulic motor and the hydraulic pump are connected via damping elements with the transmission housing. The hydraulic motor and the hydraulic pump are preferably interconnected via an intermediate plate, which radially to the axis of rotation of the hydraulic pump, has receptacles for the damping elements by which the intermediate plate can be connected with the transmission housing. But it is also possible to situate the damping elements in receptacles of the transmission housing and connect them with the intermediate plate. The intermediate plate can also be designed integrally with the housing of the hydraulic motor or the housing of the hydraulic pump. While the hydraulic pump and the hydraulic motor, dampened on their connecting point with the damping elements located in one plane, are supported in the transmission housing, the hydraulic pump-motor unit is retained in the area of its center of gravity and can move in all three axle planes against the elasticity of the damping elements. A separation of the transmission housing is not required, since the intermediate plate can be installed in the transmission housing from one side of the pump-motor unit via fastening elements, preferable a screw connection. The pump-motor unit thus has to be fastened only in its half of the transmission housing. The transmission housing preferably has receptacles for centering pins with which, during the installation, the hydraulic pump and the hydraulic motor are centered in the transmission housing and then connected with the transmission housing by the damping elements. After the hydraulic pump and the hydraulic motor have been fastened in the transmission housing by the damping elements, the centering pins can be removed again. Hereby is ensured a simple installation where, even in the presence of manufacturing tolerances, the hydraulic pump and the hydraulic motor can be installed in the position in which the hydraulic motor-pump unit achieves the required installation position. Input and output shafts of the hydraulic pump and of the hydraulic motor are connected via shafts with the toothed wheels which are in communication with the mechanical power branch, and are supported floatingly, on one side, in the shafts of the hydraulic pump or of the hydraulic motor and, on the other side, in toothed wheels connected with the mechanical power branch. The shafts each have, on their connections with the toothed wheels and the hydraulic pump or the hydraulic motor, crowned teeth or engaging gears designed as spiral gearing with which can be compensated, in combination with the floating support of the shaft, skewed positions or movements of the hydraulic pump and of the hydraulic motor. The toothed wheels, which accommodate the shaft for connection with the hydraulic motor or the hydraulic pump, are supported in the transmission housing so that movements of the hydraulic pump or of the hydraulic motor cannot be transmitted to the running gears of the toothed wheels. It is hereby ensured that the running gears always have the same engagement geometry during operation. Since crowned teeth or a spiral gearing have a smaller contact surface than a straight toothing, the bone conduction is transmitted to a lesser extent than in a standard toothed shaft connection. The hydraulic power branch is thus, on one hand, supported with dampened vibration in the transmission housing in one plane, via the damping elements in the center of gravity of the hydraulic motor whereby an optimal degree of freedom and an easy installation are obtained and, on the other, connected via shafts having crowned teeth with the mechanical power branch whereby the bone conduction is also reduced.

BRIEF DESCRIPTION OF THE DRAWINGS

The invention will now be described, by way of example, with reference to the accompanying drawings in which.

DETAILED DESCRIPTION OF THE INVENTION

Figure 1:
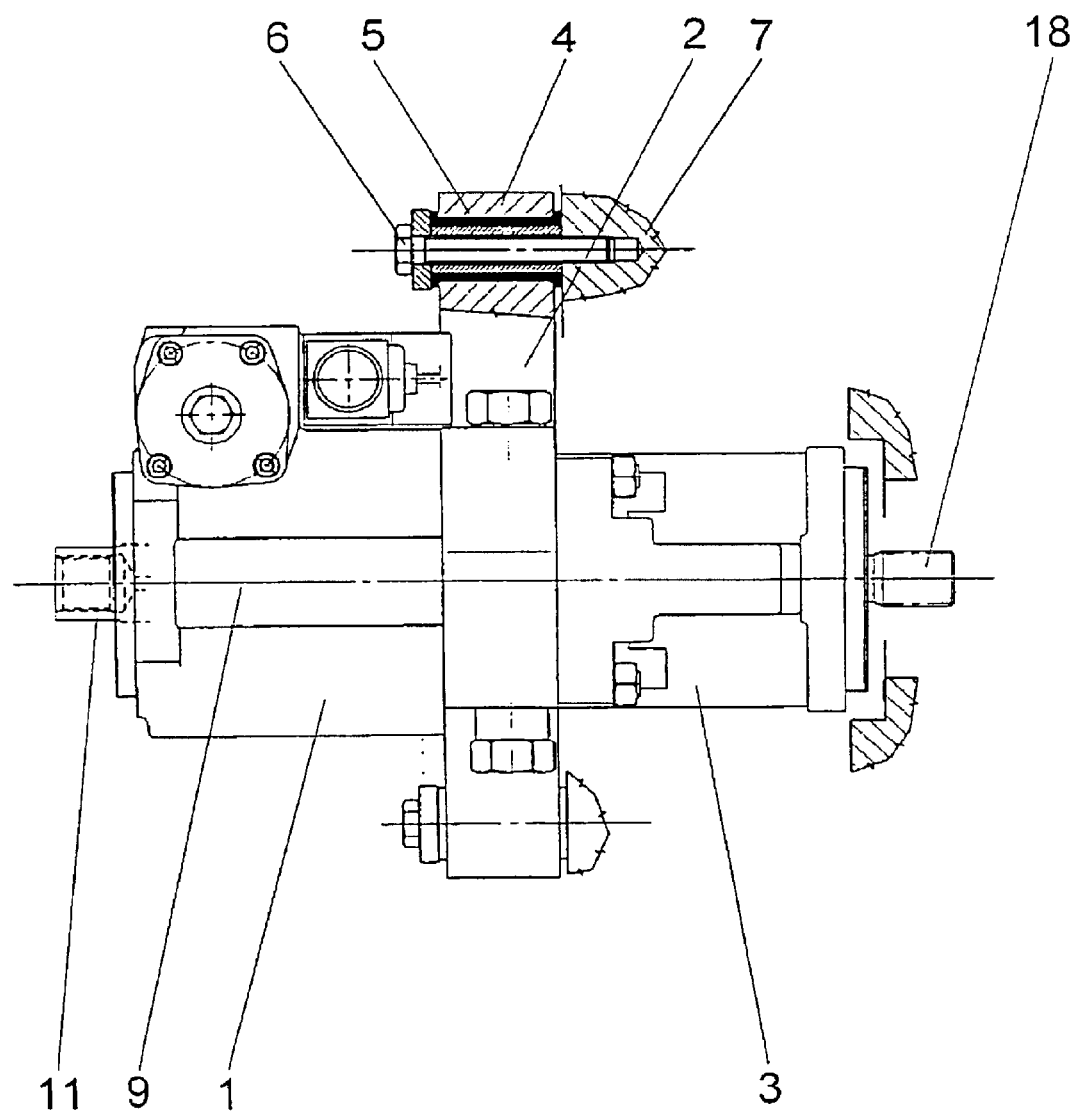
FIG. 1 a first embodiment of a dampened suspension of the hydraulic pump and of the hydraulic motor.
Figure 2:
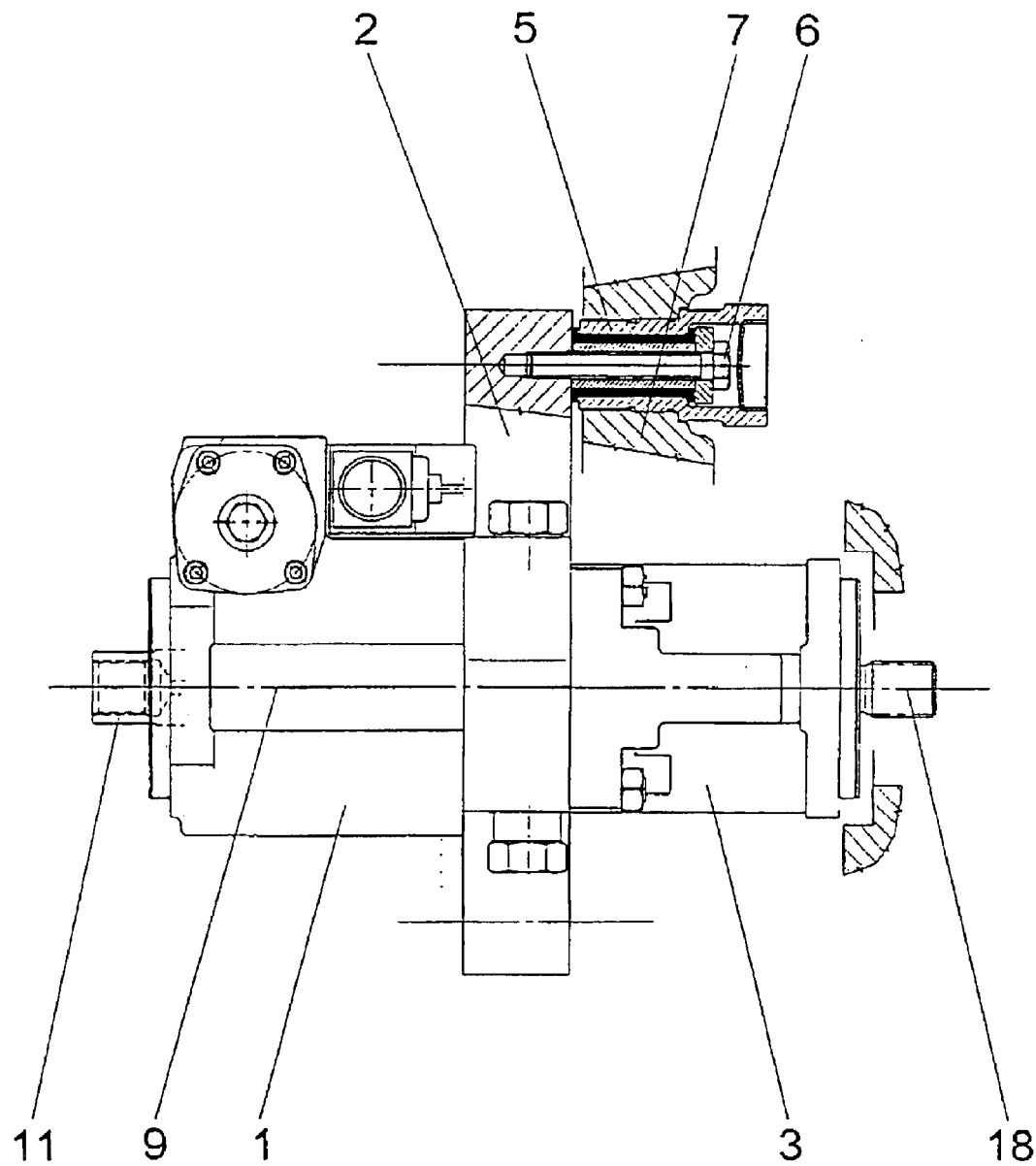
FIG. 2 a second embodiment of a dampened suspension of the hydraulic pump and of the hydraulic motor.
Figure 3:
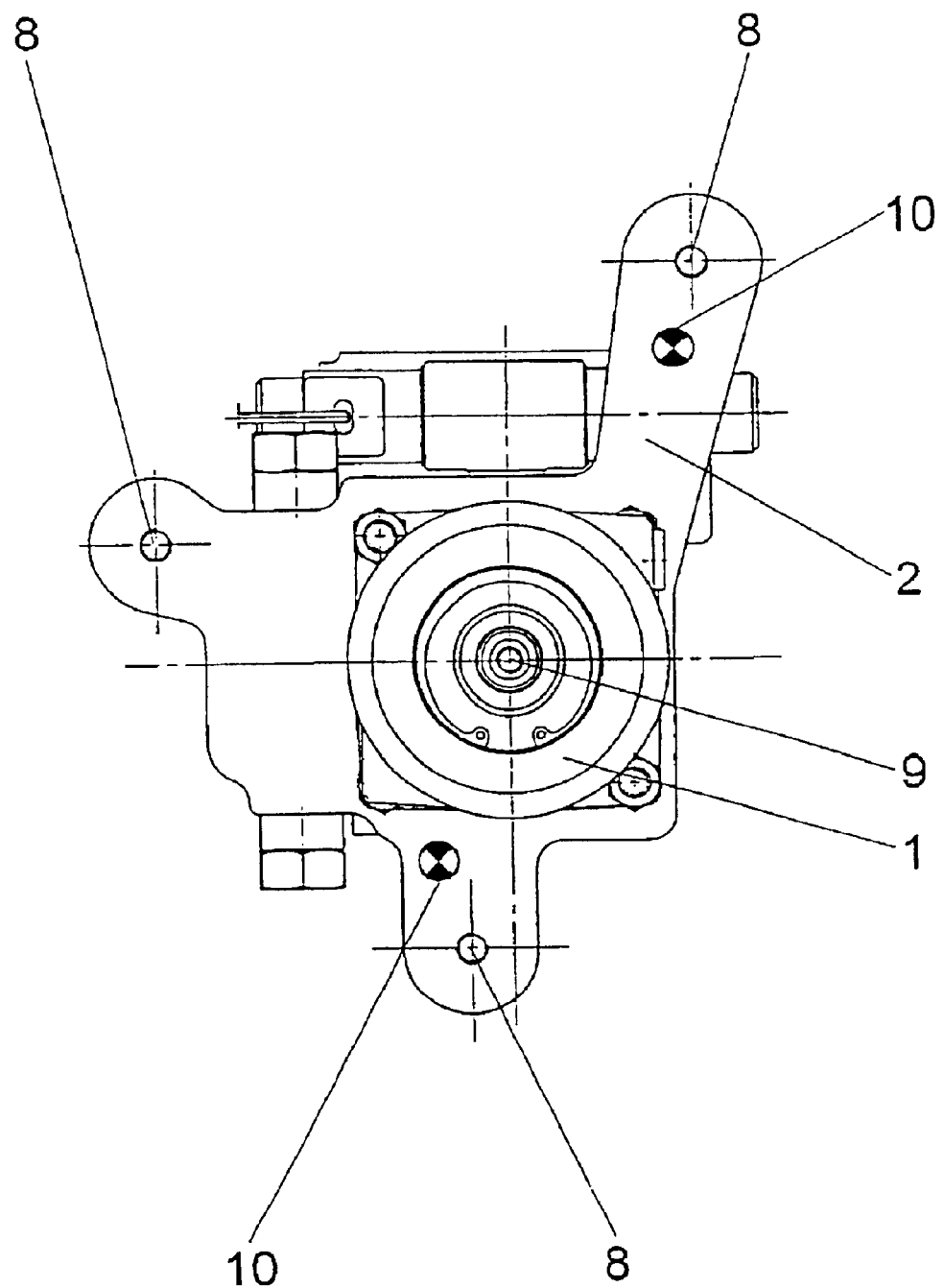
FIG. 3 a side view of the hydraulic pump and of the hydraulic motor of FIG. 1 with the bolts removed.
Figure 4:
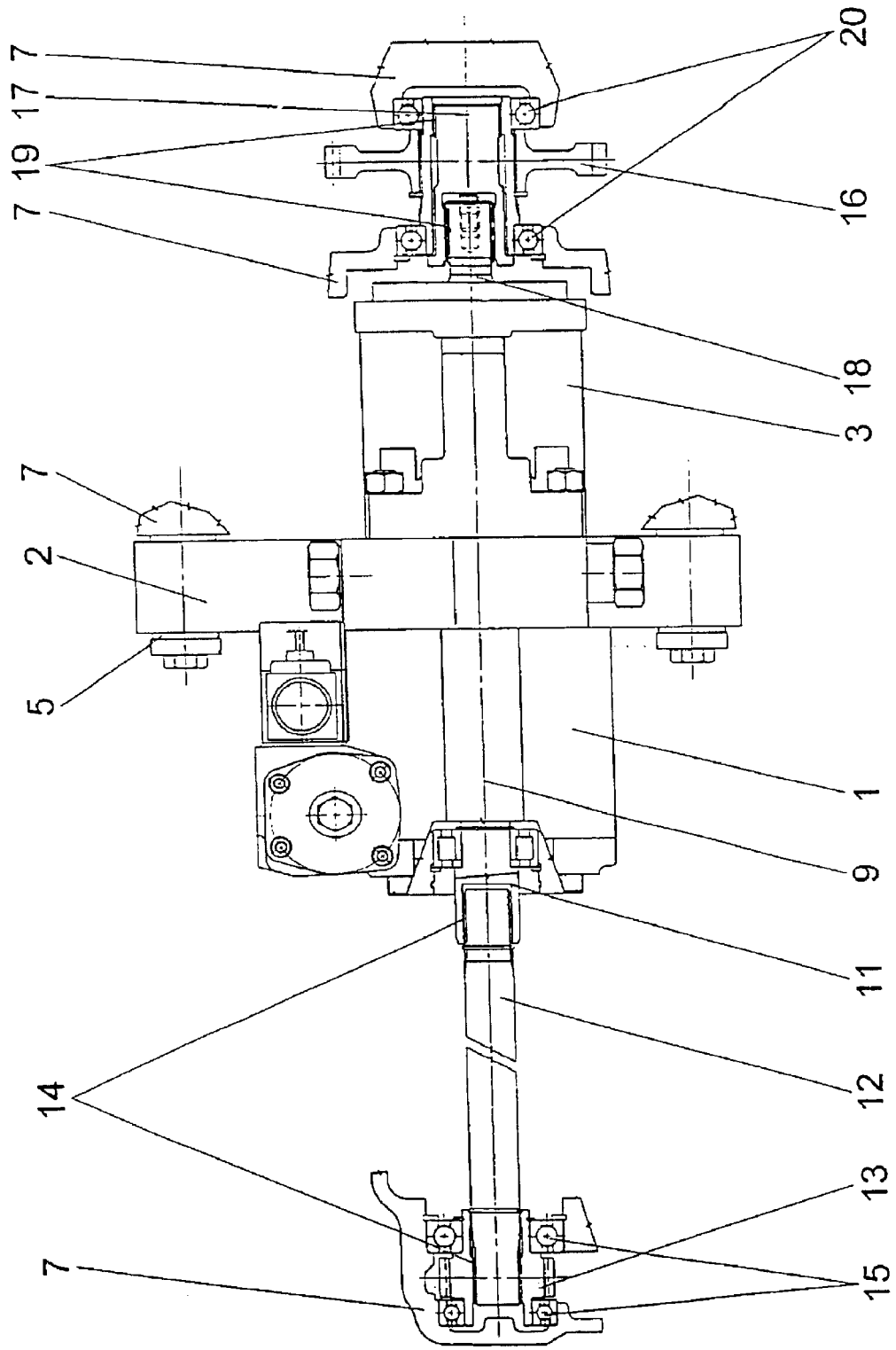
FIG. 4 the connection of the hydraulic motor and of the hydraulic pump with toothed wheels which are connected with the mechanical power branch.

FIG. 1:

A hydraulic pump 1 is connected via an intermediate plate 2 with a hydraulic motor 3 and forms the hydraulic power branch of a power distribution transmission. The intermediate plate 2 has receptacles 4 in which are placed damping elements 5 connected via connecting elements 6 with the transmission housing 7. The damping elements 5 are configured so that the intermediate plate 2 has no direct contact to the transmission housing 7 and can freely move in all three axles against the elasticity of the damping elements 5. The connection elements 6, which are shown here as screws, are all situated upon the same side and thus are well accessible for the installation. Besides screw elements, still other connecting elements such as alignment pins or snap rings can also be considered.

FIG. 2:

A hydraulic pump 1 is connected via an intermediate plate 2 with the hydraulic motor 3, the intermediate plate 2 being non-turnably connected via damping elements 5 with the transmission housing 7. The damping elements 5 are located within the transmission housing 7 and accessible for assembly outside the transmission housing.

FIG. 3:

The intermediate plate 2 has fastening points 8 which are situated radially around the axis of rotation 9 of the hydraulic pump 1. On the fastening points 8 are fastened the damping elements 5 not shown in this figure. The intermediate plate 2 has centerings 10 with which the hydraulic pump and the hydraulic motor can be centered in the transmission housing 7 in order to ensure the exact position of the hydraulic pump and of the hydraulic motor. If the intermediate plate 2 is fixedly connected via the damping elements 5 with the transmission housing, the centering elements are removed again in order that the hydraulic pump and the hydraulic motor can again move freely. An easy assembly is thus ensured.

FIG. 4:

A hydraulic pump 1 and a hydraulic motor 3 are interconnected via an intermediate plate 2, the intermediate plate 2 being elastically fastened via damping elements 5 in the transmission housing. The drive shaft 11 of the hydraulic pump 1 is connected via a shaft 12 with a toothed wheel 13 which communicates with the mechanical power branch of the power distribution transmission. The shaft 12 has on its ends crowned teeth or toothings designed as spiral gearing and is floatingly supported via said toothings 14 in the toothed wheel 13 and the drive shaft 11. By the toothing 14 being designed as crowned teeth and the shaft 12 floatingly supported, movements of the hydraulic pump and of the hydraulic motor are possible and are not transmitted to the running gears of the toothed wheel 13, since in addition the toothed wheel 13 is fixedly supported in the transmission housing 7 via the bearing 15. The toothed wheel 16, which on one side communicates with the mechanical power branch and on the other, via a shaft 17, with the drive shaft 18 of the hydraulic motor 3, has on its connecting points crowned teeth or toothings 19 designed as spiral gearing whereby the hydraulic motor 3 and the hydraulic pump 1 can freely move and the movements are not transmitted to the toothed wheel 16, since in addition the toothed wheel 16 is supported in the transmission housing 7 via a bearing 20. It is thus ensured that the running gear of the toothed wheel 16 be not affected.

Reference Numerals
1 hydraulic pump
2 intermediate plate
3 hydraulic motor
4 receptacles
5 damping elements
6 connecting elements
7 transmission housing
8 fastening points
9 axis of rotation
10 centering
11 drive shaft
12 shaft
13 toothed wheel
14 toothing
15 bearing
16 toothed wheel
17 shaft
18 output shaft
19 toothing
20 bearing

What is claimed is:

1. A power distribution transmission having one mechanical and one hydraulic power branch, a hydraulic pump (1) and a separate hydraulic motor (3) both being interconnected with the hydraulic power branch, an intermediate plate (2) being located between the hydraulic pump (1) and the hydraulic motor (3) and the hydraulic pump (1) being coaxial with the hydraulic motor (3), the intermediate plate (2) defining a plane and being secured to a transmission housing (7) via connecting elements (6) including elastic damping elements (5), and said hydraulic pump (1) and said hydraulic motor (3) communicate with said mechanical power branch via shafts (12, 17) which are floatingly supported, wherein remote ends of said shafts (12, 17) have one of crowned teeth and spiral gearing at connecting points (14, 19) which couple said shafts (12, 17) to the mechanical power branch, the connecting elements intersect the plane, said intermediate plate (2) has receptacles (4) for accommodating at least one of said connecting elements (6) and said damping elements (5), and said receptacles (4) are radially disposed around an axis of rotation (9) of said hydraulic pump (1)—have been inserted after "plane".

2. The power distribution transmission according to claim 1, wherein remote ends of each of said shafts (12, 17)

support a toothed wheel (13, 16) and are supported within said transmission housing (7) by bearings (15, 20).

3. The power distribution transmission according to claim 1, wherein said hydraulic pump (1) has centering receptacles (10) for centering said hydraulic pump (1) with respect to said intermediate plate (2) within said transmission housing (7).

4. The power distribution transmission according to claim 2, wherein the hydraulic pump (1) has centering receptacles (10) for centering the hydraulic pump (1) with respect to the intermediate plate (2) within the transmission housing (7).

5. The power distribution transmission according to claim 2, wherein remote ends of each of the shafts (12, 17) support a toothed wheel (13, 16) and are supported within the transmission housing (7) by bearings (15, 20).

6. A power distribution transmission having one mechanical and one hydraulic power branch, a hydraulic pump (1) and a separate hydraulic motor (3) both being interconnected with the hydraulic power branch, an intermediate plate (2) being located between the hydraulic pump (1) and the hydraulic motor (3) and the hydraulic pump (1) being coaxial with the hydraulic motor (3), the intermediate plate (2) being secured to a transmission housing (7) via connecting elements (6) including elastic damping elements (5), and said hydraulic pump (1) and said hydraulic motor (3) communicate with said mechanical power branch via shafts (12, 17) which are floatingly supported, wherein remote ends of said shafts (12, 17) have one of crowned teeth and spiral gearing at connecting points (14, 19) which couple shafts (12, 17) to the mechanical power branch; and said connecting elements (6) and said damping elements are all situated in one plane.

7. The power distribution transmission according to claim 6, wherein the intermediate plate (2) has receptacles (4) for accommodating at least one of the connecting elements (6) and the damping elements (5).

8. The power distribution transmission according to claim 7, wherein the receptacles (4) for at least one of the according elements (6) and the damping elements (5) are radially disposed around an axis of rotation (9) of the hydraulic pump (1).

9. A power distribution transmission comprising:

an intermediate support (2) located within a transmission housing (7);

a mechanical power branch; and a hydraulic power branch having a hydraulic pump (1) and a hydraulic motor (3), with the hydraulic pump (1) being located on one side of the intermediate support (2) and the hydraulic motor (3) being located on an opposite side of the intermediate support (2), and the intermediate support (2) defining a plane and being secured to a transmission housing (7) via connecting elements (6) including elastic damping elements (5) to facilitate floating movement of the hydraulic pump (1) and the hydraulic motor (3) along three axes with respect to a remainder of the transmission, the connecting elements intersecting the plane; said intermediate support (2) is an intermediate plate (2), said intermediate plate (2) has receptacles (4) for accommodating at least one of said connecting elements (6) and said damping elements (5), and said receptacles (4) are radially disposed around an axis of rotation (9) of said hydraulic pump (1)—have been inserted after "plane".

the hydraulic pump (1) and the hydraulic motor (3) communicating with the mechanical power branch via a pair of floatingly supported opposed shafts (12, 17), and each of the pair of floatingly supported opposed shafts (12, 17) having one of crowned teeth and spiral gearing at a remote connecting point (14, 19) which couples the shaft (12 or 17) to the mechanical power branch; and the hydraulic pump (1) being arranged coaxially with the hydraulic motor (3).

10. The power distribution transmission according to claim 9, wherein each remote end of the pair of floatingly supported opposed shafts (12, 17) is supported within the transmission housing (7) by bearings (15, 20) and has a toothed gear (13, 16).

11. The power distribution transmission according to claim 9, wherein the hydraulic pump (1) has centering receptacles (10) for centering the hydraulic pump (1) with respect to an aperture in the intermediate plate (2).

12. The power distribution transmission according to claim 9, wherein the damping elements intersect the plane and each one of the connecting elements (6, is accessible from the same side.

13. The power distribution transmission according to claim 9, wherein each receptacle (4) of the intermediate plate (2) accommodate one of the connection elements (6) and one of the damping elements (5).

* * * * *